US012324453B2

(12) United States Patent
Wertz et al.

(10) Patent No.: US 12,324,453 B2
(45) Date of Patent: Jun. 10, 2025

(54) BEVERAGES WITH IMPROVED PARTICLE SUSPENSION PROPERTIES, AND METHODS OF MAKING THE SAME

(71) Applicant: SENSIENT COLORS LLC, St. Louis, MO (US)

(72) Inventors: Caitlin Wertz, St. Louis, MO (US); Abby Christman, St. Louis, MO (US); Karen Brimmer, St. Louis, MO (US); Liangji Xu, St. Louis, MO (US); James Buchheit, St. Louis, MO (US)

(73) Assignee: Sensient Colors LLC, St. Louis, MO (US)

( * ) Notice: Subject to any disclaimer, the term of this patent is extended or adjusted under 35 U.S.C. 154(b) by 0 days.

(21) Appl. No.: 17/768,880

(22) PCT Filed: Oct. 14, 2020

(86) PCT No.: PCT/US2020/055474
§ 371 (c)(1),
(2) Date: Apr. 14, 2022

(87) PCT Pub. No.: WO2021/076550
PCT Pub. Date: Apr. 22, 2021

(65) Prior Publication Data
US 2024/0090552 A1 Mar. 21, 2024

Related U.S. Application Data

(60) Provisional application No. 62/914,768, filed on Oct. 14, 2019.

(51) Int. Cl.
A23L 29/269 (2016.01)
A23L 2/02 (2006.01)
A23L 2/54 (2006.01)
A23L 2/58 (2006.01)
C08B 37/00 (2006.01)

(52) U.S. Cl.
CPC ............ *A23L 29/272* (2016.08); *A23L 2/02* (2013.01); *A23L 2/54* (2013.01); *A23L 2/58* (2013.01); *C08B 37/006* (2013.01); *A23V 2200/228* (2013.01); *A23V 2200/244* (2013.01); *A23V 2250/5054* (2013.01)

(58) Field of Classification Search
CPC . A23L 29/272; A23L 2/02; A23L 2/54; A23L 2/58; A23L 2/56; A23L 2/60; A23L 2/62; A23L 2/68; A23L 29/269; A23L 29/30; C08B 37/006; H10D 84/921; C08L 5/00; A23V 2200/228; A23V 2200/244; A23V 2250/5054
See application file for complete search history.

(56) References Cited

U.S. PATENT DOCUMENTS

| | | | | |
|---|---|---|---|---|
| 5,597,604 A | * | 1/1997 | Chalupa | A23F 5/243 426/573 |
| 2008/0008814 A1 | * | 1/2008 | Jackson | A23C 9/1542 426/573 |
| 2008/0145505 A1 | * | 6/2008 | Bezanson | A23L 2/52 426/660 |
| 2011/0123651 A1 | * | 5/2011 | Mower | A61P 29/00 977/773 |
| 2012/0107468 A1 | * | 5/2012 | Doyle | A23L 29/272 426/573 |
| 2013/0195921 A1 | | 8/2013 | Bush | |
| 2013/0280404 A1 | * | 10/2013 | Heidebach | A23L 29/272 426/578 |
| 2015/0327585 A1 | * | 11/2015 | Domoto | A23L 33/20 426/590 |
| 2019/0297933 A1 | * | 10/2019 | Batori | A23L 2/52 |

FOREIGN PATENT DOCUMENTS

| | | | |
|---|---|---|---|
| CN | 104585835 A | 5/2015 | |
| CN | 111066995 A | 4/2020 | |
| JP | 2002017272 A | 1/2002 | |
| JP | 2004129596 A | 4/2004 | |
| JP | 2009261393 A | 11/2009 | |
| WO | WO-9619925 A1 * | 7/1996 | ............... A23L 2/52 |
| WO | 2010135589 A2 | 11/2010 | |
| WO | 2021076550 A1 | 4/2021 | |

OTHER PUBLICATIONS

Translation of JP 2013192534A (Year: 2013).*
Translation of JP 2009055879A (Year: 2009).*
Translation of CN 101564121A (Year: 2009).*
Translation of KR 20090112493A (Year: 2009).*
International Search Report and Written Opinion in corresponding PCT Application No. PCT/US2020/055474, issued Feb. 19, 2021.
20876487.8 , "European Application Serial No. 20876487.8, Extended European Search Report mailed Jul. 6, 2023", Sensient Technologies Corporation, 16 pages.
Anonymous , "Kelcogel TM, Gellan Gum Book", XP002646532, Retrieved from the Internet: URL:http://www.appliedbioscience.com/docs/Gellan_Book_5th_Edition.pdf p. 19-p. 20, 2007, pp. 1-29.
PCT/US2020/055474 , "International Application Serial No. PCT/US2020/055474, International Preliminary Report on Patentability mailed Apr. 19, 2022", Sensient Technologies Corporation, 7 pages.
Wustenberg, Tanja , "General Overview of Food Hydrocolloids In: Cellulose and Cellulose Derivatives in the Food Industry: Fundamentals and Applications", Wiley, XP055607555, p. 54, line 22-line 23 paragraph [1.5.2], 2015, 68 pages.

* cited by examiner

Primary Examiner — Drew E Becker
(74) Attorney, Agent, or Firm — GTC Law Group PC & Affiliates

(57) ABSTRACT

Beverages with improved particle suspension properties are disclose, along with methods of making the same. The beverages include a low-acyl gellan gum and insoluble particles. The low-acyl gellan gum undergoes a gel transition that provides adequate gelation to maintain the particles in suspension. The low-acyl gellan gum undergoes the gel transition below a threshold above which the particles and/or a gelled portion of the gum would rise to the top of the beverage via bubbles moving upward through the beverage.

19 Claims, No Drawings

BEVERAGES WITH IMPROVED PARTICLE SUSPENSION PROPERTIES, AND METHODS OF MAKING THE SAME

CROSS-REFERENCE TO RELATED APPLICATIONS

This application is a national stage application filed under 35 U.S.C. § 371 of International Application No. PCT/US2020/055474, filed Oct. 14, 2020, which claims priority to, and incorporates by reference herein for all purposes U.S. Provisional Patent Application No. 62/914,768, filed Oct. 14, 2019.

BACKGROUND

Particulate suspension in beverages is a technical challenge that has long challenged food scientists in the beverage industry. Historically, surface modification of the particles themselves has been one option explored for addressing this issue, but surface modification has significant drawbacks, including expense.

One additional complication is particles that are not spherical. Non-spherical particles can be uniquely difficult to maintain in suspension. One particularly challenging non-spherical particle is a mica based pearlescent pigment, which is a substantially planar particle. Another particularly challenging non-spherical particle is a fruit pulp particle, which can have a distribution of particle shapes, from a juice-filled particle having the rough shape of a rugby ball to an empty particle having a substantially planar shape. Suspending these sorts of particles is challenging due to the directionally-specific forces that are felt by the particles (i.e., a planar particle experiences a different force if you push on one of the planar faces versus pushing on an edge).

Another additional complication is suspending particles in carbonated beverages. The particles tend to aggregate within or near carbonation bubbles.

A need exists for beverage and gelatin (at pre-gelling phase) formulations that overcome the difficulty in maintaining non-surface-modified particles in suspension. A further need exists for beverage formulations that overcome the particular difficulty in maintaining non-spherical particles, such as pearlescent pigment particles or fruit pulp particles, in suspension. A need also exists for beverage formulations that maintain particles in suspension within carbonated beverages without those particles aggregating within or near carbonation bubbles or being driven to the surface of the beverage by rising carbonation bubbles.

BRIEF SUMMARY

In an aspect, the present disclosure provides a beverage. The beverage includes a low-acyl gellan gum, a gelation inducing agent, insoluble particles, and water. The low-acyl gellan gum is present in an amount by weight of between 0.001% and 0.15%. The low-acyl gellan gum has at least 50% fewer acyl-containing groups when compared to native gellan gum. The gelation inducing agent is present in an amount by weight of between 0.001% and 0.5%. The low-acyl gellan gum has undergone a gel transition that exceeds a minimum gelation threshold and does not exceed a maximum gelation threshold. The minimum gelation threshold is a gelation above which a first proportion of the insoluble particles are suspended within the top 90% of the volume of the beverage after a first predetermined length of time without agitation. The first proportion is at least 50%. The first predetermined length of time is 24 hours. The maximum gelation threshold is a gelation above which a second proportion of the insoluble particles within the beverage and/or a gelled portion of the low-acyl gellan gum rise to the top 10% of the volume of the beverage by way of rising bubbles traveling upward through the beverage for a second predetermined length of time. The second proportion is at most 50%. The second predetermined length of time is 60 minutes.

In another aspect, the present disclosure provides a method of making a beverage with particle suspension stability. The method includes: a) dissolving a low-acyl gellan gum in a first solution, the first solution optionally comprising one or more non-gelation-inducing salts; b) mixing the first solution with a second solution, the first solution and the second solution optionally substantially lacking a gelation inducing agent that induces gelation of the low-acyl gellan gum, the mixing producing a third solution, the first solution, the second solution, and/or the third solution including insoluble particles; c) lowering pH of the third solution, thereby optionally producing the beverage; and d) in response to the second solution substantially lacking the gelation inducing agent, optionally adding the gelation inducing agent to the third solution following step c), thereby optionally producing the beverage.

DETAILED DESCRIPTION

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

As used herein, a "beverage" refers to a human-consumable liquid that includes solely ingredients that are recognized by one or more agency with the United States government or within the European Union or the government of any European Union nation (including the United Kingdom) as being safe for human consumption. Beverages can include liquids that are being used to prepare non-liquid compositions, such as pre-gelation liquids that are used to form gelatin.

As used herein, "insoluble particle" refers to any particle that does not completely dissolve in within 2 hours, 3 hours, 4 hours, 5 hours, 6 hours, 7 hours, 8 hours, 12 hours, 24 hours, 3 days, 7 days, or 14 days.

The present disclosure provides a beverage including insoluble particles and a low-acyl gellan gum, where the insoluble particles are retained in suspension with improved longevity of suspending the particles. The beverage typically includes a gelation inducing agent, though it should be appreciated that the gelation inducing agent can undergo a chemical transformation when it is used, such that the resulting beverage includes the gelation inducing agent in a different form than the form in which it was introduced into the beverage. The beverage can have a degree of gelation of the low-acyl gellan gum that is sufficient to provide the improved suspension property. In some cases, the degree of gelation is below a gelation threshold above which a portion of the insoluble particles and/or a gelled portion of the low-acyl gellan gum rise to a surface of the beverage by way of rising bubbles traveling upward through the beverage (e.g., carbonation bubbles or a reasonable facsimile thereof).

In an aspect, the beverage includes a low-acyl gellan gum, a gelation inducing agent, insoluble particles, and water. The beverage can further include other components that are frequently present in beverages, such as sweeteners, alcohol, caffeine, flavorants, non-particular colorants (e.g., dyes), pH adjusters, and other beverage components understood by those having ordinary skill in the art to be useful in beverages, so long as they do not negatively impact the particle suspension properties described herein (e.g., one of ordinary skill in the art would understand that including massive quantities of glycerol in a carbonated beverage would increase the viscosity and likely cause the insoluble particles to aggregate at the surface of the beverage by way of the carbon dioxide bubbles rising to the surface—this is just one example and those having ordinary skill in the beverage chemistry arts would recognize the existence of others). In some cases, the beverage can optionally include one or more non-gelation-inducing salts.

The low-acyl gellan gum is a gellan gum that has been modified to contain fewer acyl-containing groups when compared with native gellan gum. In some cases, the low-acyl gellan gum has at least 50% fewer acyl-containing groups when compared with native gellan gum, including but not limited to, at least at least 55%, at least 60%, at least 65%, at least 70%, at least 75%, at least 80%, at least 85%, at least 90%, at least 95%, or at least 99% fewer acyl-containing groups when compared with native gellan gum. In some cases, the low-acyl gellan gum is substantially free of acyl-containing groups. The low-acyl gellan gum can be present in the beverage in an amount by weight of at least 0.001%, at least 0.005%, at least 0.010%, or at least 0.020%. The low-acyl gellan gum can be present in the beverage in an amount by weight of at most 0.15%, at most 0.1%, at most 0.075%, at most 0.05%, or at most 0.025%. An example of a suitable commercially-available low-acyl gellan gum is Kelcogel® F Gellan Gum, available commercially from CP Kelco, Atlanta, GA.

The gelation inducing agent can be any of the known agents capable of inducing gelation of low-acyl gellan gum. Typically, the gelation inducing agent is a salt and/or an acid. In some cases, the gelation inducing agent can be a metal halide. In some cases, the gelation inducing agent can be selected from the group consisting of a calcium salt, a potassium salt, a magnesium salt, a sodium salt, and combinations thereof. In some cases, the gelation inducing agent can be selected from the group consisting of calcium chloride, potassium chloride, magnesium chloride, sodium chloride, and combinations thereof. In some cases, the gelation inducing agent is calcium chloride. The gelation inducing agent can be present in an amount suitable for inducing gelation at the levels described elsewhere herein. The gelation inducing agent can be present in the beverage in an amount by weight of at least 0.001%, at least 0.005%, at least 0.01%, at least 0.02%, or at least 0.03%. The gelation inducing agent can be present in the beverage in an amount by weight of at most 0.5%, at most 0.1%, at most 0.075%, at most 0.05%, or at most 0.04%.

The insoluble particles can be any particles that are desirable in a beverage and which have some difficulties associated with maintaining suspension. In some cases, the insoluble particles can be pigment particles, such as pearlescent pigment particles, tri-calcium phosphate particles, titanium dioxide particles, calcium carbonate particles, or iron oxide particles. Suitable pearlescent pigment particles are commercially available under the trade name Sensipearl™ and are available from Sensient Technologies, Milwaukee, WI or a subsidiary thereof. In some cases, the insoluble particles can be fruit pulp particles. Generally, the particles can be any consumable particles. In some cases, the insoluble particles are non-spherical. Non-spherical particles can be particularly difficult to maintain in suspension owing to their geometry. In some cases, the insoluble particles have a planar shape. In some cases, the insoluble particles are not surface-modified for enhanced suspension in aqueous environments. Previous approaches to improving particle suspension in liquids utilized surface-modification to provide a more hydrophilic surface for greater suspension stability, but that approach requires significant cost in processing the particles. In the present disclosure, no such surface modification is required (although, it should be appreciated that including surface modification does not deviate from various aspects of the present disclosure). The insoluble particles can be present in the beverage in an amount by weight of at least 0.0001%, at least 0.0025%, at least 0.005%, at least 0.00075%, or at least 0.01%. The insoluble particles can be present in the beverage in an amount by weight of at most 0.1%, at most 0.075%, at most 0.05%, or at most 0.025%. The insoluble particles can have an average diameter of at least 1 μm, at least 5 μm, at least 10 μm, at least 25 μm, at least 50 μm, at least 100 μm, at least 150 μm, at least 200 μm, at least 250 μm, at least 500 μm, at least 750 μm, at least 1 mm, at least 5 mm, at least 10 mm, at least 25 mm, at least 50 mm, at least 100 mm, at least 250 mm, at least 500 mm, or at least 750 mm. The insoluble particles can have an average diameter of at most 1 cm, at most 750 mm, at most 500 mm, at most 250 mm, at most 100 mm, at most 75 mm, at most 50 mm, at most 25 mm, at most 10 mm, at most 5 mm, at most 1 mm, at most 750 μm, at most 500 μm, at most 400 μm, at most 300 μm, at most 250 μm, at most 200 μm, at most 150 μm, at most 100 μm, at most 75 μm, or at most 50 μm. For non-spherical particles, the diameter can be whatever the "longest" dimension of the object is (i.e., for a planar particle, the diameter is the longest dimension within the plane of the planar shape).

The water can be present in the beverage in an amount by weight of at least 10%, at least 20%, at least 30%, at least 40%, at least 50%, at least 60%, at least 70%, at least 80%, or at least 90%. The water can be present in the beverage in an amount by weight of at most 99.99%, at most 99.95%, at most 99.9%, at most 99%, at most 98%, at most 95%, at most 90%, at most 85%, at most 80%, at most 75%, or at most 50%. The other components of the beverage, including sweeteners, alcohol, caffeine, flavorants, non-particular colorants (e.g., dyes), pH adjusters, and other beverage components understood by those having ordinary skill in the art to be useful in beverages can make up the remainder of the beverage.

The one or more non-gelation-inducing salts can be selected from the group consisting of sodium citrate, sodium benzoate, and combinations thereof.

The beverage can be a carbonated beverage, such as soda, beer, seltzer, champagne, sparkling wine, or other similar carbonated beverages. The carbonated beverage can include carbon dioxide in an amount of at least 1 g/L, at least 2 g/L, at least 3 g/L, at least 4 g/L, at least 5 g/L, at least 6 g/L, at least 7 g/L, at least 8 g/L, at least 9 g/L, or at least 10 g/L. The carbonated beverage can include carbon dioxide in an amount of at most 20 g/L, at most 17 g/L, at most 15 g/L, at most 13 g/L, at most 11 g/L, at most 10 g/L, at most 9 g/L, at most 8 g/L, at most 7 g/L, at most 6 g/L, or at most 5 g/L. Carbonation content can be measured using a Zahm $CO_2$ tester, as is understood by those having ordinary skill in the art.

Two tests are used in the present disclosure to define the quality of suspension achieved by the beverages described herein. One test relates to the ability to keep particles from falling out of suspension within the beverage and the other relates to the ability to keep particles (and other gelled solids) from rising to the top of the beverage when bubbles rise through the beverage.

The first test is rather simple and involves decanting or otherwise removing (e.g., by suction removal) the top 90% of the volume of the beverage and isolating the particles from the top 90% and the bottom 10%. Comparison of the relative proportions of particles in the top 90% and the bottom 10% gives a suspension value.

The second test is equally simple with carbonated beverages and somewhat more complicated in non-carbonated beverages. For carbonated beverages, the second test involves decanting or otherwise removing the top 10% of the volume of the beverage and isolating the particles from the top 10% and the bottom 90%. For non-carbonated beverages, the second text involves introducing bubbles into the bottom of the beverage in a size and concentration that mimics the bubbles of a carbonated beverage.

In some cases, these tests can both be performed at the same time by isolating the top 10%, the middle 80%, and the bottom 10%. Simple math can then be used to compute the amount of particles in the top or bottom 90%. In each case, for accurate testing, the portions ought to be removed with minimal additional agitation to the system, as would be understood by those having ordinary skill in the analytical arts. Each of the tests can be performed in a roughly cylindrical container, such as a beaker, a pint glass, a true cylinder, or the like, where the height of the container (or a depth of the liquid) is equal to a greater than the diameter of the container. These shapes should be understood as describing the interior volume of the container or the shape that the liquid holds when occupying the interior volume of the container. The container can be glass, metal (e.g., aluminum), plastic, or another material understood to be suitable for holding a beverage without substantially impacting the particle suspending properties of the beverage. The volume of the testing beverage can be between 8 fluid ounces and 144 fluid ounces, including 12 fluid ounces, 16 fluid ounces, or 20 fluid ounces.

In order to achieve the improved suspension properties discussed herein, without wishing to be bound by any particular theory, it is believed that the low-acyl gellan gum has undergone a gel transition that exceeds a minimum gelation threshold and does not exceed a maximum gelation threshold.

The minimum gelation threshold is a gelation above which a first proportion of insoluble particles are suspended within the beverage after a first predetermined length of time without agitation. As discussed above, this can be measured by measuring the relative proportions of insoluble particles within the top 90% of the volume of the beverage following the first predetermined length of time without agitation. In other words, when the beverage is above the minimum gelation threshold, a first proportion of the insoluble particles do not fall out of suspension after a first predetermined length of time without agitation. The first proportion can be at least 50%, at least 55%, at least 60%, at least 65%, at least 70%, at least 75%, at least 80%, at least 85%, at least 90%, or at least 95%, or higher. The first predetermined length of time can be 24 hours, 48 hours, 72 hours, 96 hours, 1 week, 2 weeks, 4 weeks, 8 weeks, 12 weeks, 16 weeks, 20 weeks, 24 weeks, 36 weeks, 48 weeks, or 52 weeks, or longer.

The maximum gelation threshold is a gelation above which a second proportion of insoluble particles and/or a gelled portion of the low-acyl gellan gum rise to the top 10% of the volume of the beverage by way of rising bubbles traveling upward through the beverage for a second predetermined length of time. In other words, when the beverage is above the maximum gelation threshold, a second proportion of the insoluble particles are elevated to a surface of the beverage via rising bubbles or a solid or semi-solid gel formed by the low-acyl gellan gum itself can rise to the surface via the rising bubbles. In carbonated beverages, the carbonation from the beverage serves as the bubbles, so simply allowing the carbonation from the beverage to evolve can cause the second proportion of insoluble particles and/or the gelled portion of the low-acyl gellan gum to rise to the surface of the beverage. The second proportion can be at most 50%, at most 45%, at most 40%, at most 35%, at most 30%, at most 25%, at most 20%, at most 15%, or at most 10%. The second predetermine length of time can be 1 hour, 2 hours, 3 hours, 4 hours, 5 hours 6 hours, 7 hours, 8 hours, 12 hours, 24 hours, 3 days, 7 days, 14 days, or more.

It should be appreciated that this disclosure is describing aspects of the present beverage in terms that are primarily functional and less compositional, because other components within the beverage can impact the compositional needs required to achieve the desired functional property. Similarly, a beverage requires certain particle suspending shortcomings in order to even consider using the invention described herein. As one example, egg nog is adequately thick that it does not have any difficulty maintaining particles in suspension, so the invention described herein would not be used with egg nog or a beverage having similar properties to egg nog.

Aside from the particle suspension properties described herein, the beverage of the present disclosure has other properties that are very similar to the properties of a nearly identical beverage that is the same as the beverage but lacks only the low-acyl gellan gum. Examples of these properties include, but are not limited to, transparency, light scattering, color, mouthfeel, taste, and the like. In addition, the viscosity will also be similar, though one having ordinary skill in the art will appreciate that the gelation discussed herein will increase the viscosity to some degree.

The present disclosure also provides a method of making a beverage with the particle suspension stability described herein. The method can include: a) dissolving a low-acyl gellan gum in a first solution, the first solution optionally comprising one or more non-gelation-inducing salts; b) mixing the first solution with a second solution, the first solution and the second solution optionally substantially lacking a gelation inducing agent that induces gelation of the low-acyl gellan gum, the mixing producing a third solution, the first solution, the second solution, and/or the third solution including insoluble particles; c) lowering pH of the third solution, thereby optionally producing the beverage; and d) in response to the second solution substantially lacking the gelation inducing agent, optionally adding the gelation inducing agent to the third solution following step c), thereby optionally producing the beverage.

The method can include: a) dissolving a low-acyl gellan gum in a first solution, the first solution optionally comprising one or more non-gelation-inducing salts; b) mixing the first solution with a second solution to produce a third solution; c) lowering pH of the third solution; and d) adding a gelation inducing agent to the third solution following the lowering pH of step c), thereby producing the beverage. The first solution, the second solution substantially lack the gelation inducing agent (i.e., gelation does not commence prior to lowering the pH of the third solution). Insoluble particles are present in the first solution or the second solution, or they are added to the third solution following the mixing of step b).

The method can include: a) dissolving the low-acyl gellan gum in the first solution, the first solution optionally comprising the one or more non-gelation-inducing salts; b) mixing the first solution with the second solution, the second solution comprising the gelation inducing agent that induces gelation of the low-acyl gellan gum, the mixing producing a third solution, the first solution, the second solution, and/or the third solution including the insoluble particles; and c) lowering pH of the third solution, thereby producing the beverage.

The method can include: a) dissolving the low-acyl gellan gum in the first solution, the first solution optionally comprising the one or more non-gelation-inducing salts; b) mixing the first solution with the second solution, the second solution comprising the insoluble particles and the gelation inducing agent that induces gelation of the low-acyl gellan gum; and c) lowering pH of the third solution, thereby producing the beverage.

In some cases, the first solution contains only the low-acyl gellan gum and water and the second solution contains the other components of the eventual beverage, except the gelation inducing agent.

The pH can be lowered to 6 or below, 5 or below, 4 or below, or 3 or below. The pH can be lowered to 3 or above.

In some cases, the method can take the form of a hot process, where the dissolving of step a) is performed at elevated temperature. The elevated temperature can be at least 35° C., at least 40° C., at least 45° C., at least 50° C., at least 55° C., at least 60° C., at least 65° C., at least 70° C., or at least 80° C. The elevated temperature can be at most 100° C., at most 95° C., at most 90° C., at most 85° C., at most 80° C., at most 75° C., at most 70° C., at most 65° C., at most 60° C., at most 55° C., at most 50° C., at most 45° C., or at most 40° C. In some cases, the hot process method can be useful with higher low-acyl gellan gum concentrations when compared with the cold process method described below. In the hot process method, the method can further include cooling the first solution following step a) and prior to step b).

In some cases, the method can take the form of a cold process, wherein the dissolving of step a) is performed a temperature closer to room temperature or lower. This temperature can be at least 0° C., at least 5° C., at least 10° C., at least 15° C., at least 20° C., or at least 25° C. This temperature can be at most 35° C., at most 30° C., at most 25° C., at most 20° C., at most 15° C., or at most 10° C.

In some cases, the method does not include adding salt to induce gelation. In these cases, the acid can be added in an amount sufficient to induce gelation and produce the beverage. In some cases, the acid is present in the underlying beverage itself (for example, in a fruit juice) and a hydrated low-acyl gellan gum can be added to that underlying beverage to induce gelation of the gum.

In most cases, the general methods described herein involve hydrating the low-acyl gellan gum first, then inducing gelation.

The first solution, second solution, third solution and all method steps can have components in the proper amounts to result in the final proportions for the beverage described herein.

The following examples represent two successfully prepared beverages in accordance with the present disclosure. It should be appreciated that these two successes were accompanied by a host of unsuccessful efforts to improve particle suspension in beverages. While the unsuccessful efforts are not emphasized here, it should be clear to those of ordinary skill in the formulation chemistry arts/beverage formulation arts that certain levels of failure are expected when first developing such products and that any given concept of what will be effective is generally unlikely to succeed without some evidence to suggest that a given approach is likely. In other words, even starting with the broad goal of improving suspension and knowledge of all of the ingredients that were used in the following formulations, the majority of efforts were unsuccessful, so one of ordinary skill in the art would not find these formulations likely to succeed in absence of strong evidence that they do in fact succeed.

In addition to the positive results described below, some other observations were made throughout the process of making the successful formulations. With the same basic process as described in the following examples, it was discovered that adjusting the pH while the solution is still hot prevents effective setting of the gum, whereas the process below that cools the solution before adjusting pH achieved the improved suspension properties. In the working examples below, lowering the pH as the last step was effective.

Example 1

A beverage having the composition of Formula 1 was made according to a hot process beverage method. A first solution was made by adding the low-acyl gellan gum to half of the water at a temperature of 80° C. The first solution was mixed well until all of the gum was dissolved and the solution temperature naturally cooled to below 35° C. The rest of the ingredients (including the other half of the water), except the $CaCl_2$ and the citric acid solution were mixed to form a second solution. The second solution was slowly added to the first solution and the resulting third solution was mixed well. The 10% citric acid solution was added slowly to the third solution and mixed well for 20 minutes. The CaCl$_2$ was added and the resulting beverage was mixed well.

After the beverage was finished, the beverage was placed in refrigeration for at least 8 hours to lower the temperature to roughly 4° C., after which the beverage was carbonated using a 3 to 1 volume ratio of carbonation and bottled. The pearlescent pigment particles remained suspended while the beverage was in the bottle. Upon opening, the pearlescent pigment particles remained suspended for at least 24 hours.

| Formula 1 | | |
|---|---|---|
| Component | 100% | 2000 gm |
| Kelcogel ® F Gellan Gum | 0.0380% | 0.76 |
| SensiPearl ™ Sparkle Silver 500 | 0.0150% | 0.3 |
| Sugar | 10.68% | 213.6 |
| CaCl2 | 0.0392% | 0.784 |
| Sodium Citrate | 0.0700% | 1.4 |
| Sodium Benzoate | 0.0750% | 1.5 |
| Lemon Lime flavor | 0.2000% | 4 |
| Water | 42.2414% | 844.828 |
| Citric Acid (10%) solution | 4.4000% | 88 |

Example 2

A beverage having a composition of Formula 2 was made using a cold fill method. A first solution was made by adding the low-acyl gellan gum to half of the water at room temperature. The first solution was mixed well for at least 20 minutes until all of the gum was dissolved. The rest of the process is the same as Example 1. The resulting beverage achieved the same suspension capabilities as beverage in Example 1.

| Formula 2 | | |
|---|---|---|
| Component | 100% | 1000 gm |
| Kelcogel ® F Gellan Gum | 0.0250% | 0.25 |
| SensiPearl ™ Intense Gold 300 | 0.0100% | 0.1 |
| Sugar | 10.68% | 106.8 |
| CaCl2 | 0.0392% | 0.392 |
| Sodium Citrate | 0.0700% | 0.7 |
| Sodium Benzoate | 0.0750% | 0.75 |
| Lemon Lime flavor | 0.2000% | 2 |
| Water | 84.5008% | 845.008 |
| Citric Acid (10%) solution | 4.4000% | 44 |

The particular aspects disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular aspects disclosed above may be altered or modified and all such variations are considered within the scope and spirit of the technology. Accordingly, the protection sought herein is as set forth in the claims below.

We claim:

1. A carbonated beverage comprising:
   a low-acyl gellan gum in an amount by weight of between 0.001% and 0.15%, wherein the low-acyl gellan gum has at least 50% fewer acyl-containing groups when compared with native gellan gum;
   a gelation inducing agent in an amount by weight of between 0.001% and 0.5%;
   optionally one or more non-gelation-inducing salts;
   insoluble particles; and
   water, wherein the low-acyl gellan gum has undergone a gel transition that exceed a minimum gelation threshold and does not exceed a maximum gelation threshold,
   wherein the minimum gelation threshold is a gelation above which a first proportion of the insoluble particles are suspended within the top 90% of the volume of the carbonated beverage after a first predetermined length of time without agitation, wherein the first proportion is at least 50%, wherein the first predetermined length of time is 24 hours, and
   wherein the maximum gelation threshold is a gelation above which a second proportion of the insoluble particles within the carbonated beverage and/or a gelled portion of the low-acyl gellan gum rise to the top 10% of the volume of the carbonated beverage by way of rising carbonation bubbles traveling upward through the carbonated beverage for a second predetermined length of time, wherein the second proportion is at most 50% and the second predetermined length of time is 60 minutes.

2. The carbonated beverage of claim 1, wherein carbon dioxide is present in the carbonated beverage in an amount of at least 1 g/L and at most 20 g/L.

3. The carbonated beverage of claim 1, wherein the first proportion is at least 55%.

4. The carbonated beverage of claim 1, wherein the first predetermined length of time is 48 hours.

5. The carbonated beverage of claim 1, wherein the second proportion is at most 45%.

6. The carbonated beverage of claim 1, wherein the second predetermined length of time is 2 hours.

7. The carbonated beverage of claim 1, wherein the one or more non-gelation-inducing salts are selected from the group consisting of sodium citrate, sodium benzoate, and combinations thereof.

8. The carbonated beverage of claim 1, wherein the insoluble particles are pearlescent pigments.

9. The carbonated beverage of claim 1, wherein the insoluble particles have a planar shape.

10. The carbonated beverage of claim 1, wherein the insoluble particles are not surface-modified for enhanced suspension in aqueous environments.

11. The carbonated beverage of claim 1, wherein the insoluble particles have an average diameter of at least 1 µm and at most 1 cm.

12. The carbonated beverage of claim 1, wherein the insoluble particles are present in the carbonated beverage in an amount by weight of at least 0.0001% and at most 0.1%.

13. The carbonated beverage of claim 1, wherein the low-acyl gellan gum is substantially free of acyl-containing groups.

14. The carbonated beverage of claim 1, wherein the gelation inducing agent is a metal halide.

15. The carbonated beverage of claim 1, wherein the gelation inducing agent is calcium chloride.

16. The carbonated beverage of claim 1, wherein the water is present in the carbonated beverage in an amount by weight of at least 10% and at most 99.99%.

17. The carbonated beverage of claim 1, wherein the carbonated beverage has an optical transparency that is at least 90% of a comparison optical transparency of a comparison carbonated beverage that is lacking the low-acyl gellan gum but is otherwise identical to the carbonated beverage.

18. The carbonated beverage of claim 1, wherein the carbonated beverage has a viscosity that is no more than 5% greater than a comparison viscosity of a comparison carbonated beverage that is lacking the low-acyl gellan gum but is otherwise identical to the carbonated beverage.

19. The carbonated beverage of claim 1, wherein the carbonated beverage has an optical scattering intensity that is no more than 5% greater than a comparison optical scattering intensity of a comparison carbonated beverage that is lacking the low-acyl gellan gum but is otherwise identical to the carbonated beverage.

* * * * *